United States Patent
Rao

(10) Patent No.: US 7,962,541 B2
(45) Date of Patent: Jun. 14, 2011

(54) OPTIMIZATION OF SPECTRUM EXTRAPOLATION FOR CAUSAL IMPULSE RESPONSE CALCULATION USING THE HILBERT TRANSFORM

(75) Inventor: Fangyi Rao, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 942 days.

(21) Appl. No.: 11/747,007

(22) Filed: May 10, 2007

(65) Prior Publication Data
US 2008/0281893 A1    Nov. 13, 2008

(51) Int. Cl.
*G06F 17/17* (2006.01)
(52) U.S. Cl. ........................................... 708/290
(58) Field of Classification Search .................. None
See application file for complete search history.

(56) References Cited

U.S. PATENT DOCUMENTS

| | | | | |
|---|---|---|---|---|
| 3,617,716 A | * | 11/1971 | Schulz | 708/290 |
| 4,535,417 A | * | 8/1985 | Peacock | 708/300 |
| 5,673,210 A | * | 9/1997 | Etter | 702/69 |
| 2009/0006508 A1 | * | 1/2009 | Youssefi et al. | 708/132 |

OTHER PUBLICATIONS

Thomas J. Brazil—"Causal-Convolution—A New Method For The Transient Analysis Of Linear Systems At Microwave Frequencies"; IEEE Transactions On Microwave Theory And Techniques, vol. 43, No. 2, Feb. 1995; pp. 315-323.
Philip A. Perry and Thomas J. Brazil—"Forcing Causality On S-Parameter Data Using The Hilbert Transform"; IEEE Microwave And Guided Wave Letters, vol. 8, No. 11, Nov. 1998; pp. 378-380.

* cited by examiner

*Primary Examiner* — David H Malzahn

(57) ABSTRACT

A causal impulse response function is calculated from a truncated spectrum by extending the real part of the spectrum beyond the truncation frequency and computing the imaginary part with the Hilbert transform to enforce causality. The out of band extrapolation is optimized to reduce the discrepancy between the computed and the original imaginary part in the in band frequency range so that the causal impulse response accurately represents the original spectrum. The technique can be applied to spectral with the delay phase subtracted to enforce delay causality. The Hilbert transform may be employed to maintain causality in S-parameter passivity violation correction. At frequencies where violation happens, the S-parameter matrix is scaled down by the inverse of the magnitude of the largest eigenvalue. Magnitudes at other frequencies are unchanged. An additional phase calculated by the magnitude phase Hilbert transform is added to the scaled spectrum to maintain the causality.

5 Claims, 6 Drawing Sheets

OPTIMIZATION OF SPECTRUM EXTRAPOLATION FOR CAUSAL IMPULSE RESPONSE CALCULATION USING THE HILBERT TRANSFORM

BACKGROUND

A linear component in a system is often represented in frequency domain. To obtain the time-domain response of the system driven by sources with given waveforms, the spectrum of the linear component must be converted to time-domain impulse response function by inverse Fourier transform. The Fourier transform involves integration of the spectrum over frequencies from DC to infinity. The spectral data is often available only up to the highest frequency of measurement or electromagnetic (EM) simulation. Even in cases where the analytic model of the spectrum is known, the numerical integration of the Fourier transform has to be truncated at a finite frequency. One consequence of spectrum truncation is the violation of causality in the impulse response, namely non-zero response at negative time. To restore causality, adjustments have to be made in the impulse response, including shifting the response toward the positive side of the time or manually removing responses at negative time. Such adjustments cause discrepancy between the impulse response and the original spectrum, and therefore inaccurate time-domain response. A common technique to deal with spectrum truncation is to apply a low-pass window to the spectrum. However, windowing does not solve and can worsen causality problem as it is equivalent to convolution of a low-pass filter with the original physical response. This operation always leads to ripples or ringing in negative time. Thus, it is hard to control the spectrum accuracy when adjusting the impulse response in the time domain.

While any physical response must be causal with respect to t=0, e.g. zero response when t<0, response of transmission lines must also be causal with respect to delay, e.g. zero response when t<delay time. The delay time is the time it takes for the signal travels from the input end to the output end. Delay causality should be enforced in the transmission line impulse response calculation from band-limited spectrum.

Another issue related to causality is the passivity correction of S-parameter data. Due to measurement noise or numerical error in EM simulation, S-parameter data of a passive component can be slightly non-passive at certain frequencies. Passivity violation could lead to unstable and erroneous waveforms. In time-domain simulation, it is required that the corrected S-parameters remain to be causal.

The simplest way to correct passivity violation is to scale the whole spectrum by a constant factor which is less than one. This method will not affect the causality of the spectrum. However, it penalizes the non-passive frequencies but also the passive ones. Therefore, the corrected spectrum is overly damped when compared to the original data.

SUMMARY

A causal impulse response function is calculated from a truncated spectrum by extending the real part of the spectrum beyond the truncation frequency and computing the imaginary part with the Hilbert transform to enforce causality. The out of band extrapolation is optimized to reduce the discrepancy between the computed and the original imaginary part in the in band frequency range so that the causal impulse response accurately represents the original spectrum.

For systems with delay, delay causality can be enforced in impulse response calculations by applying this technique to the modified spectrum which is shifted in time by the delay time.

The Hilbert transform may also be employed in passivity correction in S-parameter data to preserve the causal property of the response. Violation of passivity is corrected on frequency-by-frequency basis. At frequencies where violation happens, the s-parameter matrix is scaled down by the inverse of the magnitude of the largest eigenvalue. Magnitudes at other frequencies are unchanged. An additional phase calculated by the magnitude phase Hilbert transform is applied to maintain the causality of the scaled spectrum.

DETAILED DESCRIPTION

Applicant teaches enforcing causality directly in the frequency domain so the effects on the spectrum can be monitored. The spectrum causality condition is given by Kramers-Kronig relations that state that the real and imaginary parts of a causal response are related by the following Hilbert transforms:

$$u(\omega) = \frac{1}{\pi} P \int_{-\infty}^{\infty} \frac{v(\omega')}{\omega - \omega'} d\omega'$$

$$v(\omega) = -\frac{1}{\pi} P \int_{-\infty}^{\infty} \frac{u(\omega')}{\omega - \omega'} d\omega'$$

Equation 1 where u and v are real and imaginary parts of the spectrum respectively. P is the Cauchy principal value. For discrete samples, the Hilbert transform becomes:

$$u(\omega) = h(0) + \frac{1}{2\pi} P \int_{-\pi}^{\pi} v(\omega') \cot \frac{\omega - \omega'}{2} d\omega'$$

$$v(\omega) = -\frac{1}{2\pi} P \int_{-\pi}^{\pi} u(\omega') \cot \frac{\omega - \omega'}{2} d\omega'$$

Equation 2 h(0) is the response at time equals zero. The Hilbert transform is used to enforce causality and minimize the discrepancy between the causal spectrum and the original spectrum within the in band frequency range by optimizing the out of band extrapolation.

Figure 1A:
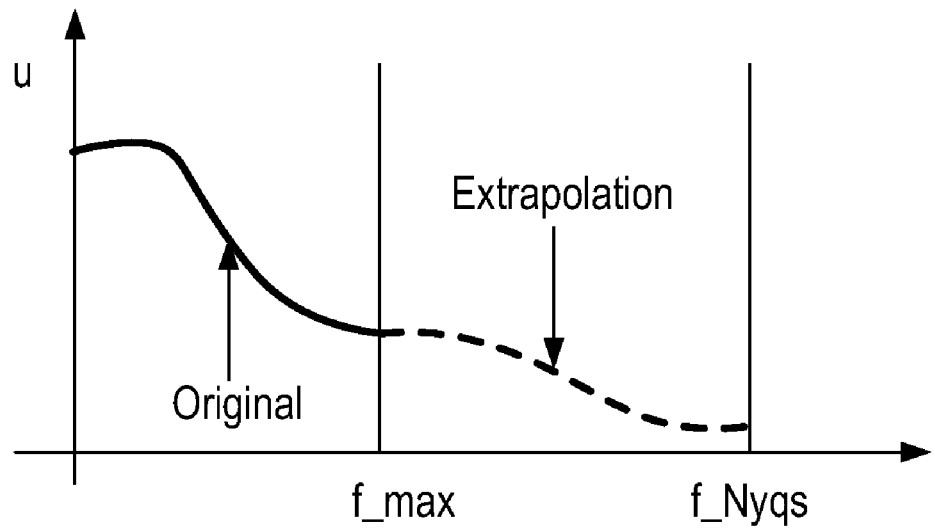
FIGS. 1a and 1b illustrates the real and imaginary parts of the spectral data according to the invention.
Figure 1B:
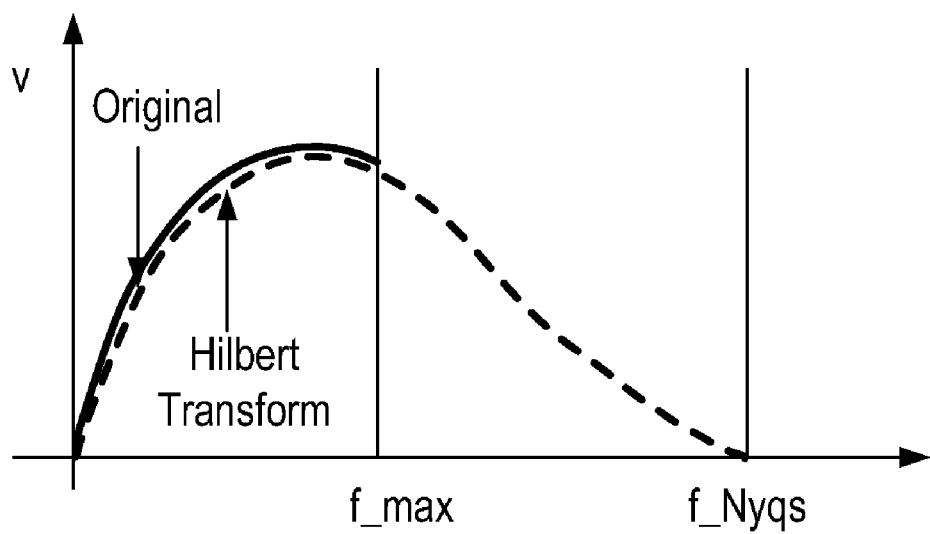

As shown in FIG. 1, the real part u is extended continuously from the cut-off frequency f_max to the Nyquist frequency f_Nyqs using polynomial functions up to $4^{th}$ order.

$$u(f) = c0 + c1 \cdot (f-f\_Nyqs) + c2 \cdot (f-f\_Nyqs)^2 + c3 \cdot (f-f\_Nyqs)^3 + c4 \cdot (f-f\_Nyqs)^4$$

Equation 3

Because spectrum of discrete samples replicates itself above the Nyquist frequency and because the real part of the spectrum of a real time-domain response is symmetric around zero frequency, u must be symmetric around f_Nyqs. Thus, odd order terms in equation 3 must be zero and $$u(f)=c0+c2\cdot(f-f\_Nyqs)^2+c4\cdot(f-f\_Nyqs)^4 \quad \text{Equation 4}$$

Coefficients c0, c2 and c4 in Equation 4 are determined by the value of u at f_Nyqs and by the continuation condition at f_max $$u(f\_Nyqs) = c0 \quad \text{Equation 5}$$

$$u(f\_max) =$$
$$c0 + c2\cdot(f\_max-f\_Nyqs)^2 + c4\cdot(f\_max-f\_Nyqs)^4$$

$$\frac{du(f\_max)}{df} =$$
$$2\cdot c0\cdot(f\_max-f\_Nyqs) + 4\cdot c4\cdot(f\_max-f\_Nyqs)^3$$

As shown in equation 5, the extrapolation of u is determined by two variables, f_Nyqs and u(f_Nyqs).

The imaginary part v is calculated by the Hilbert transform of u to enforce causality and is compared with the original imaginary part from 0 to f_max. The discrepancy is minimized by optimizing values of f_Nyqs and u(f_Nyqs). The impulse response is then computed from the optimal causal spectrum u and v. The discrepancy in the imaginary part tends to be smaller at low frequency than at high frequency because of the convolution nature of the Hilbert transform.

Figure 2:
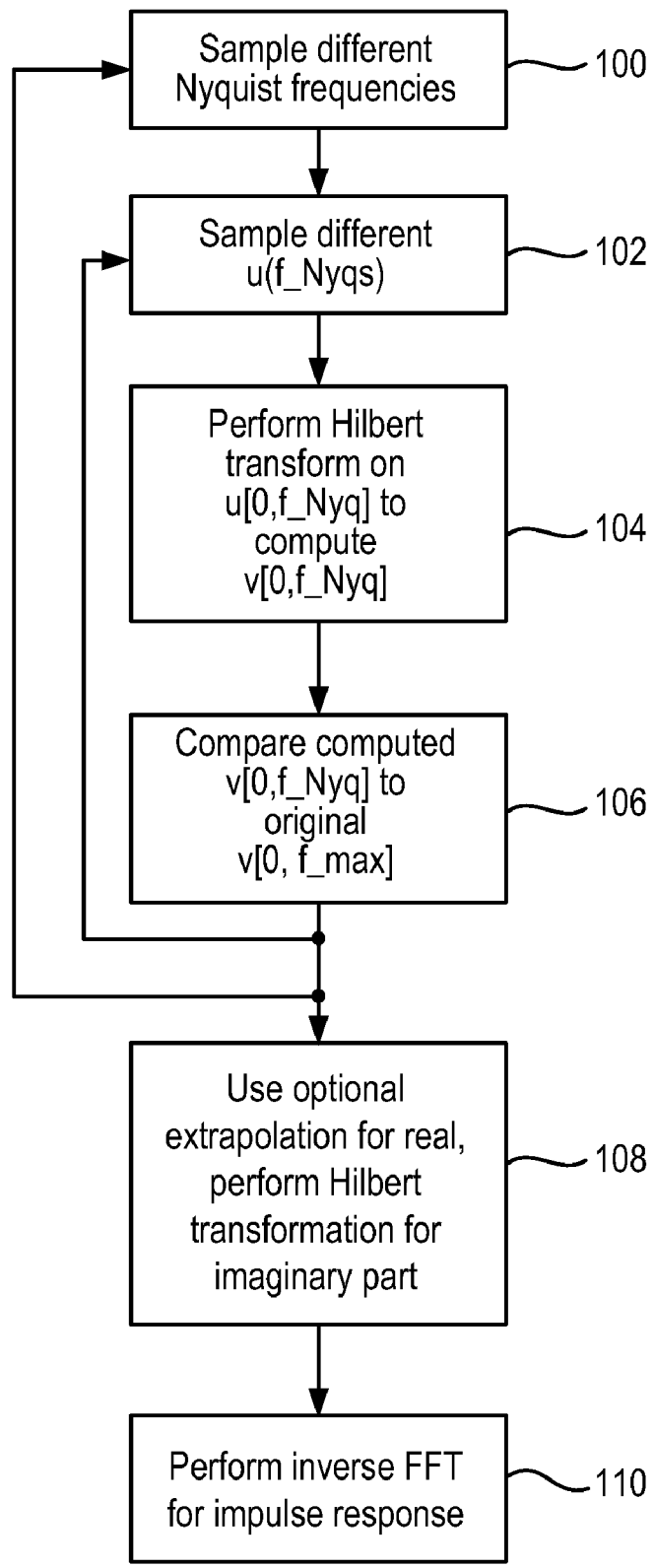
FIG. 2 is a process flowchart according to the invention.

FIG. 2 is a flowchart according to the invention. In step 100, different Nyquist frequencies are sampled. In step 102, different u(f_Nyqs) are sampled. In step 104, a Hilbert transform is performed on the real part to compute the imaginary. In step 106, the computed imaginary is compared to the original imaginary. In step 108, the optimal extrapolation curve is selected. In step 110, an inverse Fast Fourier Transform is performed for the impulse response.

Figure 3A:
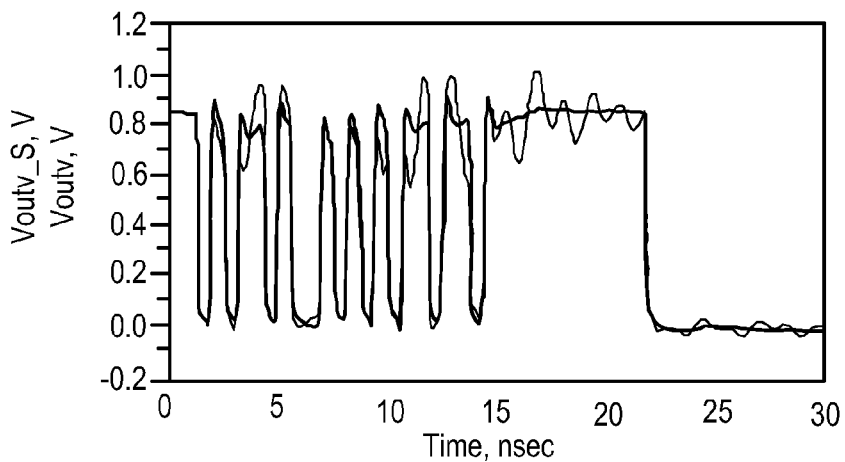
FIGS. 3a-c illustrate the impulse calculation in the prior art.
Figure 3B:
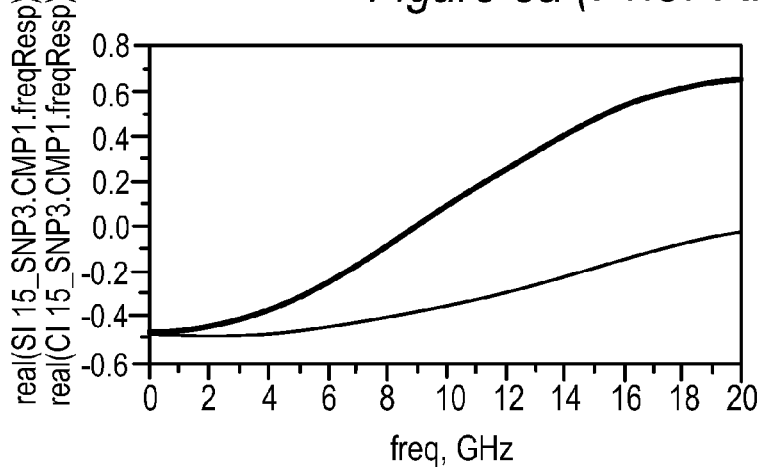
Figure 3C:
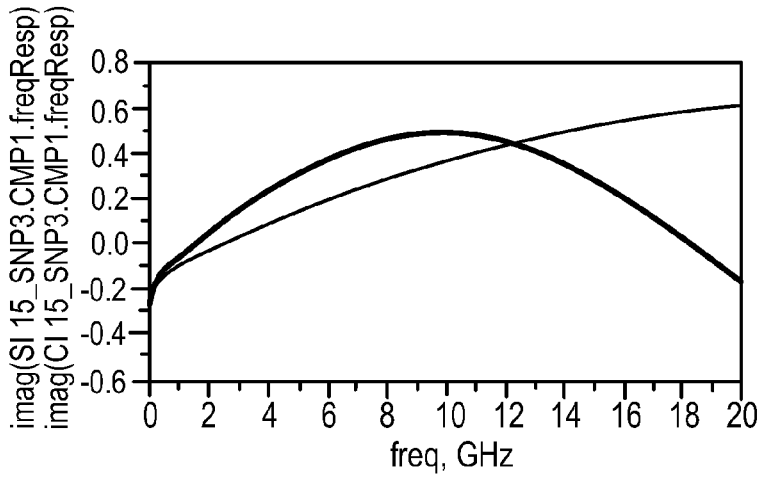

FIG. 3(*a*) illustrates the conventional method for impulse response calculation, the response (thick line) of a circuit represented by its s-parameter spectral up to 20 GHz failed to match the response (thin line) of the same circuit represented by lumped elements. FIGS. 3(*b*) and 3(*c*) show the discrepancy in real and imaginary parts between the original spectrum (thin line) and the spectrum corresponding to the impulse response (thick line).

Figure 4A:
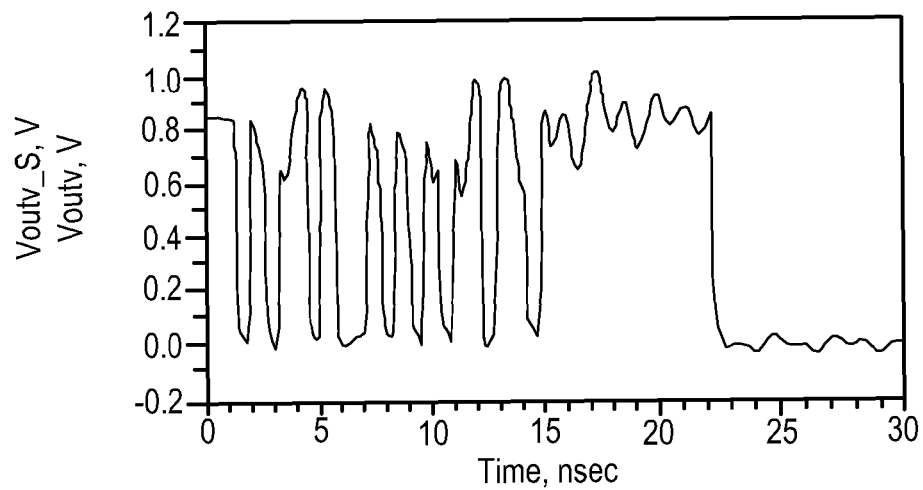
FIGS. 4a-c illustrate the invention as applied to the same circuit used in FIGS. 3a-c.
Figure 4B:
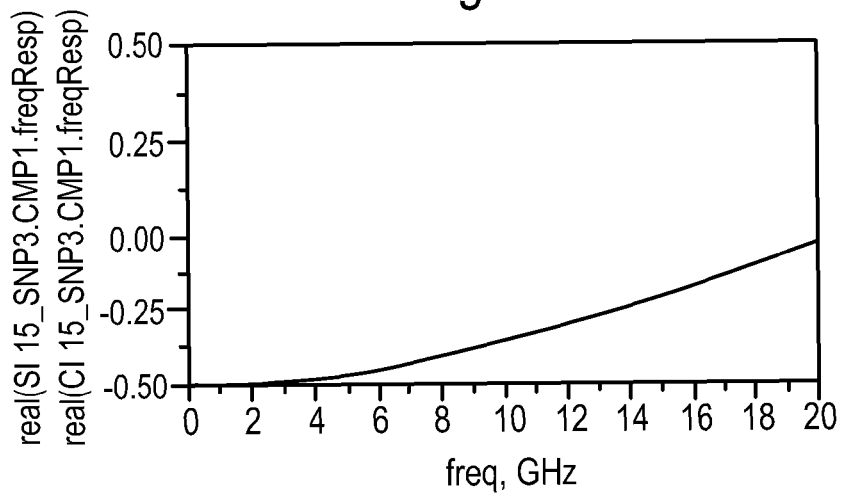
Figure 4C:
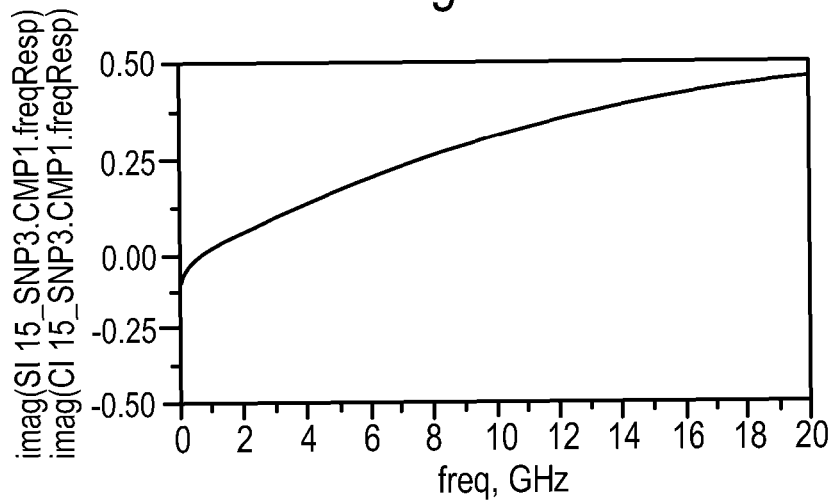

FIGS. 4(*a-c*) illustrates the invention as applied to the same circuit used in FIGS. 3(*a-c*). Perfect matching of the waveform was achieved between the s-parameter and the lumped element representations of the circuit.

The technique can be modified to enforce delay causality in transmission line impulse response calculations. The delay causal condition for impulse response h(t) is h(t)=0 when t<td, where td is the delay time. It is equivalent to condition h(t+td)=0 when t<0. The spectrum of h(t+td), H'(ω), can be obtained from the spectrum of h(t), H(ω)), by subtracting the delay phase $$H(\omega)=\exp(j\cdot\omega\cdot t_d)H(\omega) \quad \text{Equation 6}$$

To enforce delay causality, first, the Hilbert transform based approach described above is applied on H' so that H' is causal with respect to t=0. After the causal h(t+td) is computed from H', h(t) is obtained by shifting h(t+td) in time axis by td. The resulting h(t) is causal with respect to delay.

Figure 5:
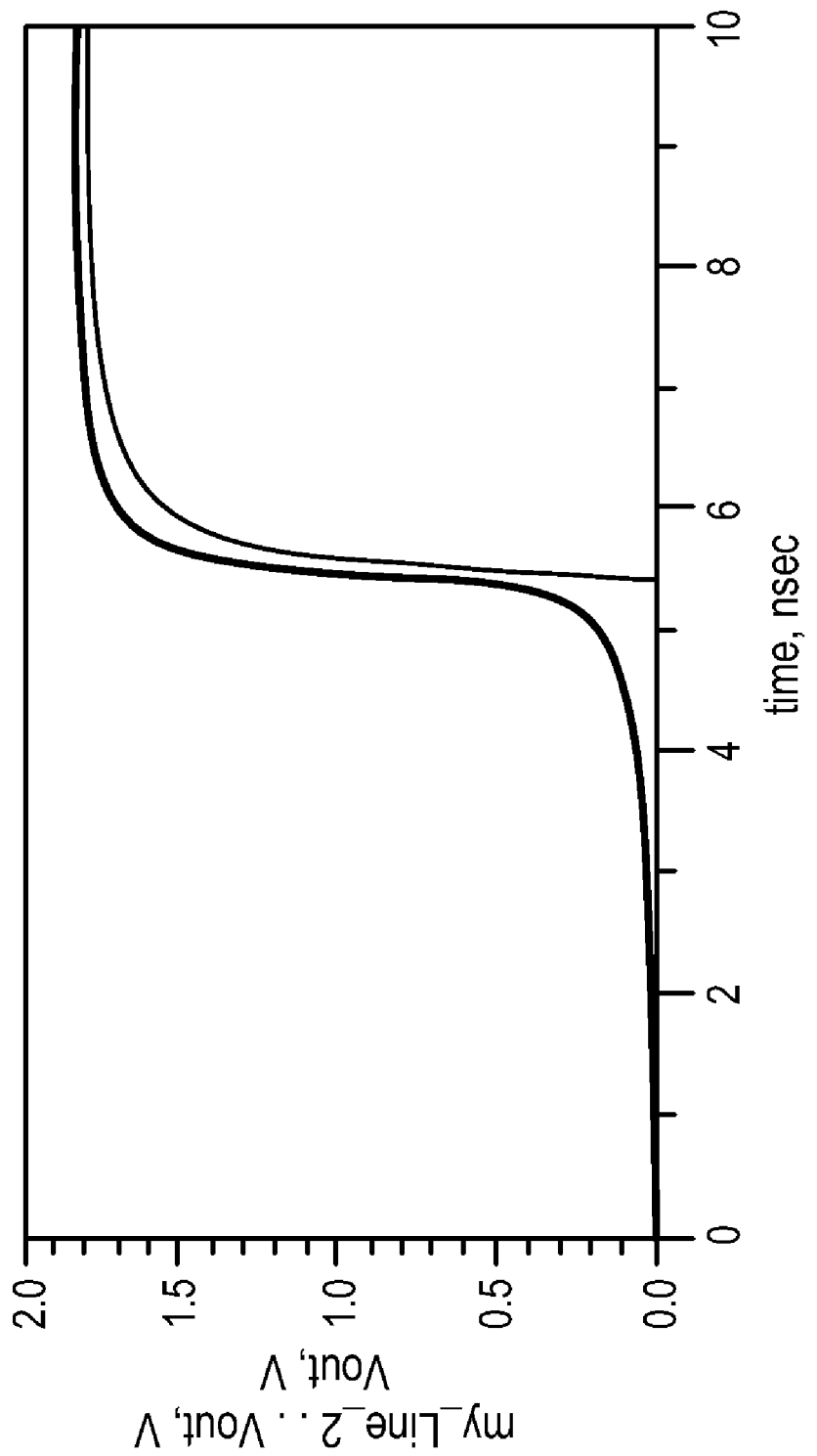
FIG. 5 shows the output waveforms of a micro-strip line with about 5.5 ns delay time.

FIG. 5 shows the output waveforms of a micro-strip line with about 5.5 ns delay time. The result without delay causality enforcement (thick line) shows non-causal response before the delay time. After the delay causality is applied, the result (thin line) has zero response before the delay time.

The Hilbert transform may be applied to restore causality in S-parameter data after correcting its passivity violation in a frequency-by-frequency basis. The passivity condition for s-parameter at a given frequency is that all the eigenvalues of the s-parameter matrix have magnitudes less than one. Due to measurement noise or numerical error in simulations, minor violations could occur in s-parameter data at certain frequencies.

The Applicants teach that the largest eigenvalue s_max is calculated at each frequency within the in band range. At the frequency where |s_max|>1, the s-parameter matrix is scaled down by factor 1/|s_max| to correct the passivity violation. Magnitudes at other frequencies including out of band region are unchanged. This approach has minimal impact on spectral accuracy and avoid over damping the original data. Since the magnitude of scaling is frequency dependent, an additional phase is added to the scaled spectrum to maintain causality. The phase is obtained by using the magnitude phase Hilbert transform:

$$\phi(\omega) = -\frac{1}{2\pi}P\int_{-\pi}^{\pi}\ln\alpha(\omega')\cot\frac{\omega-\omega'}{2}d\omega'$$

α is the magnitude scaling factor and φ is the phase. For minor violations, α is very close to 1 and results in a small φ, typically of the order 1e-3. For passive frequencies, α is 1. The minimum phase condition is hence satisfied and causality of the combination of α and φ is guaranteed by the magnitude phase Hilbert transform.

Figure 6A:
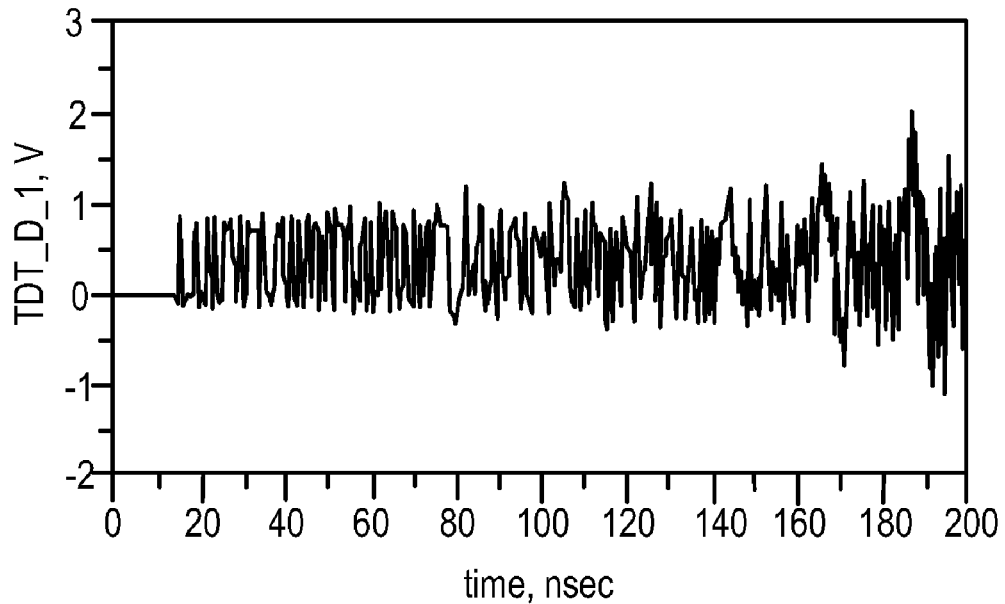
FIG. 6(a) illustrates a s-parameter file for a circuit containing 200 identical elements.
Figure 6B:
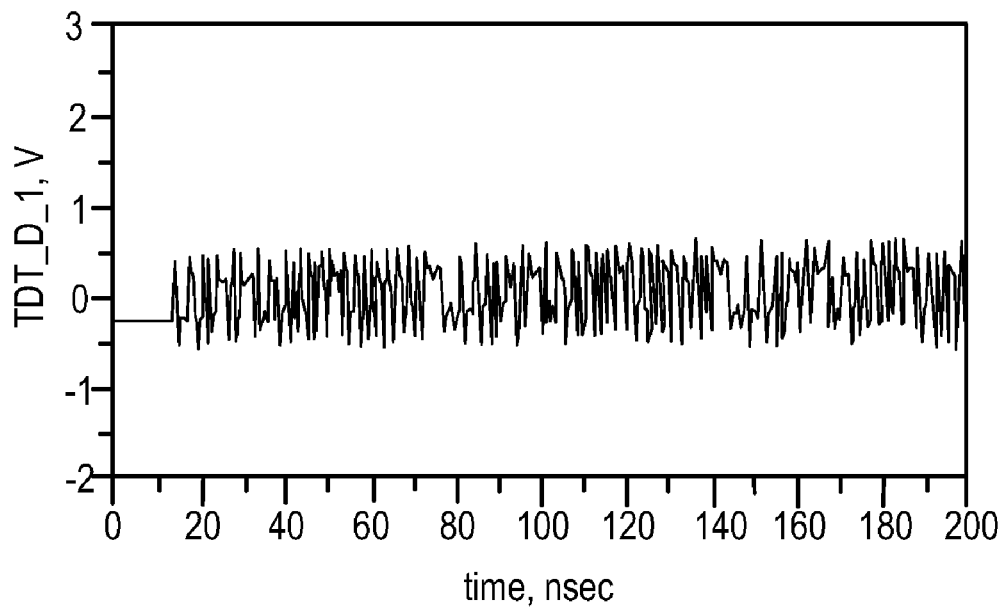
FIG. 6(b) shows that after the passivity correction as described above, the waveform is stabilized.

FIG. 6(*a*) illustrates the simulated waveform of a circuit which contains 200 identical elements in cascade. Each element is represented by the same S-parameter data which is known to be non-passive. The passivity violation is amplified in the circuit by placing these elements in series and results in an unstable waveform. FIG. 6(*b*) shows that after the passivity correction as described above, the waveform is stabilized.

I claim:

1. A computer implemented method for generating a time-domain response of a linear circuit component characterized by a complex-valued response function in the frequency domain, said response function being band-limited to a spectrum having frequencies between a minimum frequency and maximum frequency, said method comprising:

selecting a Nyquist frequency for said time-domain response, said Nyquist frequency being greater than said maximum frequency;

extrapolating the real part of said response function from said maximum frequency to said Nyquist frequency to extend said real part of said response function to frequencies between said maximum frequency and said Nyquist frequency, said extrapolated real part depending on a plurality of variables including said Nyquist frequency;

performing a Hilbert transform on said extrapolated real part of said response function to generate a computed imaginary part of said response function; and performing an inverse Fourier transformation on said computed imaginary part and said extrapolated real part of said response function to obtain said time-domain response, wherein said plurality of variables are chosen such that said computed imaginary part of said response function differs from said imaginary part of said band-limited spectrum for frequencies between said minimum and maximum frequencies by less than a predetermined value.

2. A method, as in claim 1, comprising applying passivity correction of said response function after said extrapolation and before said performing of said Hilbert transform.

3. A method, as in claim 2, wherein said passivity correction comprises scaling said response function for at least one frequency by a factor that depends on that frequency and adding a phase to said response function at that frequency to maintain causality.

4. A method, as in claim 1, comprising enforcing delay causality after said extrapolation and before said performing of a Hilbert transform.

5. A method, as in claim 4, wherein enforcing delay causality comprises:

subtracting a delay phase factor corresponding to a predetermined delay time from said response function in the frequency domain to obtain a modified response function determining said plurality of variables as using said modified response function; and shifting said time-domain response by a predetermined time to obtain a new time-domain response.

* * * * *